United States Patent
Gaither (10) Patent No.: US 7,310,708 B2
(45) Date of Patent: Dec. 18, 2007

(54) CACHE SYSTEM WITH GROUPS OF LINES AND WITH COHERENCY FOR BOTH SINGLE LINES AND GROUPS OF LINES

(75) Inventor: Blaine D. Gaither, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 450 days.

(21) Appl. No.: 10/649,917

(22) Filed: Aug. 26, 2003

(65) Prior Publication Data

US 2004/0039879 A1 Feb. 26, 2004

Related U.S. Application Data (63) Continuation of application No. 09/919,309, filed on Jul. 31, 2001, now Pat. No. 6,662,277.

(51) Int. Cl.
   *G06F 12/00* (2006.01)
(52) U.S. Cl. ............... 711/141; 707/200; 711/118
(58) Field of Classification Search ........... 711/141, 711/144, 145, 146, 147, 148
   See application file for complete search history.

(56) References Cited

U.S. PATENT DOCUMENTS

| | | | | |
|---|---|---|---|---|
| 5,615,334 A | * | 3/1997 | Wang et al. ............... | 714/48 |
| 6,374,332 B1 | * | 4/2002 | Mackenthun et al. ....... | 711/145 |
| 6,412,046 B1 | * | 6/2002 | Sharma et al. ............. | 711/137 |
| 6,493,809 B1 | * | 12/2002 | Safranek et al. ........... | 711/167 |
| 6,647,453 B1 | * | 11/2003 | Duncan et al. ............ | 710/306 |
| 6,711,662 B2 | * | 3/2004 | Peir et al. ................ | 711/204 |

OTHER PUBLICATIONS

Microsoft Computer Dictionary, 5th Edition, 2002, Microsoft Press pp. 77-78.*
Handy, Jim, The Cache Memory Book Second Edition, 1998, pp. 67-69 and 202.*

* cited by examiner

*Primary Examiner*—Brian R. Peugh
*Assistant Examiner*—Matthew Bradley (57) ABSTRACT

In a computer system with caching, memory transactions can retrieve and store groups of lines. Coherency states are maintained for groups of lines, and for individual lines. A single coherency transaction, and a single address transaction, can then result in the transfer of multiple lines of data, reducing overall latency. Even though lines may be transferred as a group, the lines can subsequently be treated separately. This avoids many of the problems caused by long lines, such as increased cache-to-cache copy activity.

7 Claims, 5 Drawing Sheets

CACHE SYSTEM WITH GROUPS OF LINES AND WITH COHERENCY FOR BOTH SINGLE LINES AND GROUPS OF LINES

RELATED APPLICATIONS

This application is a continuation of application Ser. No. 09/919,309, filed Jul. 31, 2001, now U.S. Pat. No 6,662,277, which is hereby incorporated by reference.

FIELD OF INVENTION

This invention relates generally to computer systems and more specifically to cache memory systems.

BACKGROUND OF THE INVENTION

Most computer systems employ a multilevel hierarchy of memory systems, with relatively fast, expensive, limited-capacity memory at the highest level of the hierarchy and proceeding to relatively slower, lower cost, higher-capacity memory at the lowest level of the hierarchy. Typically, the hierarchy includes a small fast memory called a cache, either physically integrated within a processor integrated circuit, or mounted physically close to the processor for speed. There may be separate instruction caches and data caches. There may be multiple levels of caches.

Caches are commonly organized around an amount of memory called a line, or block, or page. The present patent document uses the term "line," but the invention is equally applicable to systems employing blocks or pages.

Many computer systems employ multiple processors, each of which may have multiple levels of caches. Some caches may be shared by multiple processors. All processors and caches may share a common main memory. A particular line may simultaneously exist in memory and in the cache hierarchies for multiple processors. All copies of a line in the caches must be identical, a property called coherency. The protocols for maintaining coherence for multiple processors are called cache coherence protocols.

A cache "owns" a line if the cache has permission to modify the line without issuing any further coherency transactions. There can only be one "owner" of a line. For any cache coherence protocol, the most current copy of a cache line must be retrieved from the current owner, if any, and a copy of the data must be delivered to the requestor. If the line is to be modified, ownership must be acquired by the requester, and any shared copies must be invalidated.

There are three common approaches to determine the location of the owner of a line, with many variations and hybrids. In one approach, called a snooping protocol, or snoop-based protocol, the owner is unknown, and all caches must be interrogated (snooped) to determine the location of the most current copy of the requested line. All requests for access to a cache line, by any device in the system, are forwarded to all caches in the system. Eventually, the most current copy of a line is located and a copy is provided to the requestor. In a single-bus system, coherence (snooping) traffic, addresses, and often data all share a common bus.

In a second approach, called a directory-based protocol, memory is provided to maintain information about the state of every line in the memory system. For example, for every line in memory, a directory may include a bit for each cache hierarchy to indicate whether that cache hierarchy has a copy of the line, and a bit to indicate whether that cache hierarchy has ownership. For every request for access to a cache line, the directory must be consulted to determine the owner, and then the most current copy of the line is retrieved and delivered to the requestor. Typically, tags and status bits for a directory are stored in main memory, so that a request for state information cycles main memory and has the latency of main memory. In a multiple bus system, directory traffic may be on a separate bus.

A third approach is a global coherency filter, which has a tag for every valid line in the cache system. A coherency filter is a snoop system with a second set of tags, stored centrally, for all caches in the system. A request for a cache line is forwarded to the central filter, rather than to all the caches. The tags for a coherency filter are typically stored in a small high-speed memory. Some coherency filters may only track owned lines, and may not be inclusive of all shared lines in the system. In a multiple bus system, coherency filter traffic may be on a separate bus.

For relatively small systems, with one bus or with only a few buses, snoop-based protocols provide the best performance. However, snoop-based systems with one bus increase bus traffic, and for large systems with one bus or with only a few buses, snoop traffic can limit overall performance. Directory-based systems increase the time required to retrieve a line (latency) relative to snooping on a single bus, but in a multiple-bus system a directory requires less coherency traffic on the system buses than snoop-based systems. For large multiple-bus systems, where bus traffic may be more important than latency, directory-based systems typically provide the best overall performance. Many computer systems use some sort of hybrid of snoop-based and directory-based protocols. For example, for a multiple bus system, snoop-based protocols may be used for coherency on each local bus, and directory-based protocols may be used for coherency across buses.

If a processor requests a line, the overall time required to retrieve the line (overall latency) includes (1) the time required to acquire access rights using a cache coherency protocol, (2) the time required to process an address, and (3) the time required to retrieve and transfer the data. As discussed above, bus traffic for coherency requests can limit overall performance.

One way to decrease bus traffic for coherency requests is to increase the line size. For example, if contiguous lines are requested, each line requires a separate coherency request. If line size is doubled, twice as much data is read for each coherency request. In addition, a substantial part of overall latency is the time required to route a memory request to the various memory components and to get the data from those components. Larger lines provide more data for each request. However, as lines become even larger, much of the data transferred is not needed, and much of the cache space is filled with data that is not needed. This increases the bus traffic for data transfer, and increases the cache miss rate, both of which negatively impact overall performance. In addition, some fraction of a line may be needed exclusively by more than one processor or node. This can cause excessive cache-to-cache copy activity as the two processors or nodes fight for ownership, and the resulting number of coherency requests may increase.

As an alternative, it is known to permit partial line (or partial block) invalidation. It is also known to prefetch extra sub-lines. For example, see C. K. Liu and T. C. King, A Performance Study on Bounteous Transfer in Multiprocessor Sectored Caches, *The Journal of Supercomputing*, 11, 405-420 (1997). Liu and King describe a coherence protocol for invalidating sub-lines, and for prefetching of multiple sub-lines.

There is an ongoing need to reduce overall latency while maintaining coherency, particularly for large multiple-bus systems.

SUMMARY OF THE INVENTION

A computer system retrieves and stores groups of lines. Coherency states are maintained for groups of lines and for individual lines. Alternatively, the coherency state of a group of lines can be deduced by the coherency state of all of its sublines. A single coherency transaction, and a single address transaction, can then result in the transfer of multiple lines of data, reducing overall latency. Even though lines may be retrieved as a group, the lines can subsequently be treated separately. This avoids many of the problems caused by long lines, such as increased cache-to-cache copy activity. There may be multiple owners of lines within a group of lines. Special instructions may be implemented that request up to a group of lines. That is, depending on ownership, the instruction may result in only one line being transferred, or up to an entire group of lines being transferred. For multiple-bus systems, latency may be further reduced by preferably retrieving unowned lines from memory rather than from caches.

DETAILED DESCRIPTION OF THE PREFERRED EMBODIMENT OF THE INVENTION

Figure 1:
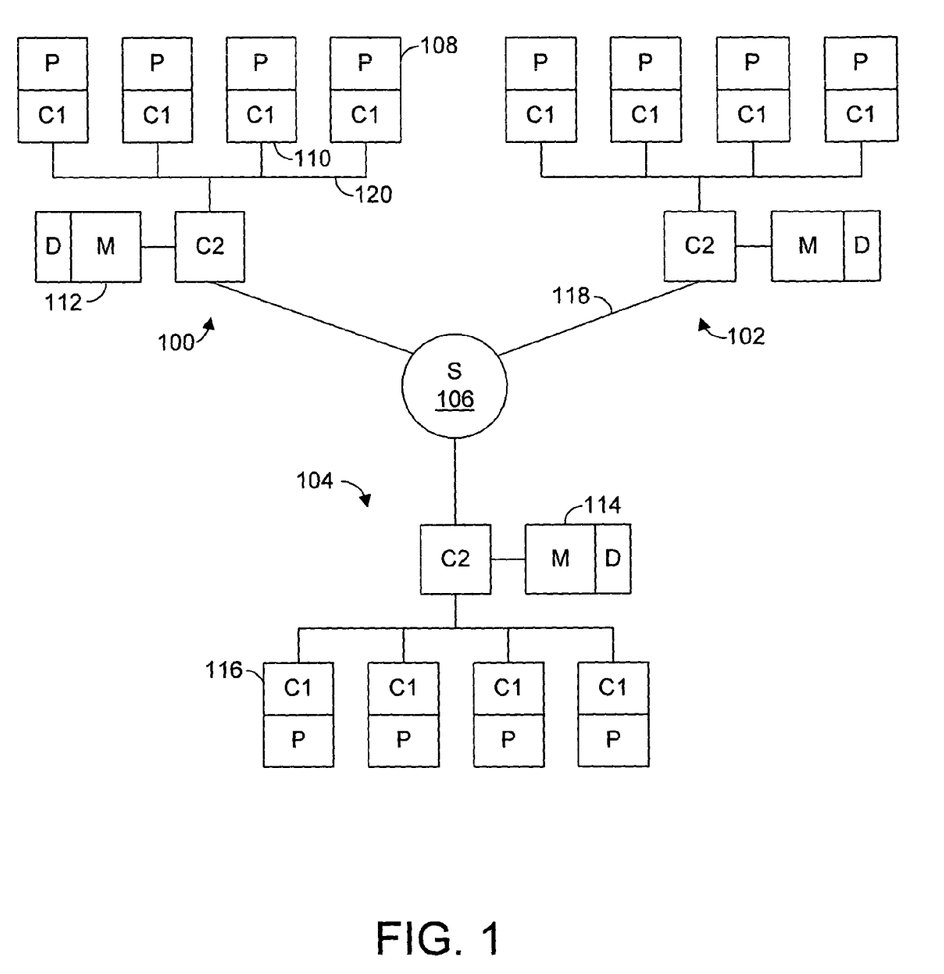
FIG. 1 is a block diagram of an example computer system suitable for use with the invention.

FIG. 1 illustrates an example computer system suitable for use with the invention. In FIG. 1, multiple nodes (100, 102, and 104) are interconnected through a switch 106 or other interconnect. Each node includes multiple processors (P). Each processor includes a first level cache (C1). Each node includes a shared second level cache (C2), and shared memory (M). Each shared memory includes a directory (D). The number of nodes, number of processors per node, number of caches, location of memory, and the use of directories, are all for purposes of illustration only.

For a cache miss, assume that the time (latency) for a processor to retrieve a line from a first level cache from another processor within its own node (for example, the latency for processor 108 to retrieve a line from cache 110) is T nanoseconds. The time for the processor to retrieve a line from the memory of its own node (for example, the latency for processor 108 to retrieve a line from memory 112) may be about 3 T nanoseconds. The time for the processor to retrieve a line from the memory of a remote node (for example, the latency for processor 108 to retrieve a line from memory 114) may be about 6 T nanoseconds. The time for the processor to retrieve a line from a first level cache in a remote node (for example, the latency for the processor to retrieve a line from cache 116) may be about 9 T nanoseconds. Within a typical single-bus system (for example, bus 120), a cache-to-cache transfer is typically faster than a transfer from memory. In a typical multiple-bus system, as in FIG. 1, a worst-case transfer from memory (6 T nanoseconds) is faster than a worst case cache-to-cache transfer (9 T nanoseconds). Therefore, for a multiple-bus system, as compared to a single-bus system, a different strategy is needed for retrieving lines in case of a cache miss in order to optimize overall memory latency.

In a typical computer system, one memory address corresponds to one line of memory. When an address is presented to a memory system, the memory system may retrieve the requested data, possibly from multiple interleaved sources, and then place the resulting data into a memory register. To increase parallelism, it is known for memory systems (for example, memory 112) to actually retrieve multiple lines and place multiple lines into a memory register. For example, in one example commercially available computer system, a line is 128 bytes, and when one line is requested, the memory system retrieves 512 bytes (4 lines) and places the lines in a register. The requesting processor only receives the one requested line. The remaining lines are available for reading with reduced latency, assuming that one of the other lines may be needed soon. Knowledge of this arrangement may be used to optimize compilers, which may then take advantage of the reduced latency for the other lines.

It is also known for caches to have an associated prefetch buffer, so that in case of a cache miss, the requested line and N successive lines are retrieved from memory. Typically, the transfer of each of the N lines is the result of a separate bus transaction. The requesting cache only receives the one requested line, and the remaining lines are available for reading with reduced latency assuming that one of the other lines may be needed soon.

In contrast to the above, in a computer system in accordance with the invention, a group of lines may be retrieved from memory, or copied from a cache, and the entire group of lines may be cached by the requester, with a single read instruction. In addition, cache coherency is maintained for groups of lines, in addition to individual lines. In particular, individual lines within a group of lines may have different owners. Several advantages result. First, consider the relative latency times discussed above. If processor 108 requests a line that is in memory 114, much of the latency involves locating the line. If it is likely that adjacent lines will be needed (spatial locality), a system in accordance with the invention provides multiple lines for very little incremental latency. Individual ownership of lines within groups of lines reduces cache-to-cache copy activity. In addition, special memory instructions permit transfer of a variable number of lines, depending on ownership, further reducing cache-to-cache copy activity. In addition, as will be discussed in more detail below, a system in accordance with the invention will typically transfer a group of lines from memory rather than from a cache, thereby reducing the average latency, reducing local bus traffic, and reducing link (for example, 118) traffic, for a multiple bus system. For example, if a processor in node 100 requests a line that is memory 114 in node 104, and is also cached in a cache in node 102, the system will find the entry in the directory for node 104, and retrieve the lines directly from memory 114 rather than cause additional bus traffic on node 102. Accordingly, a system using groups of lines in accordance with the invention reduces latency and takes advantage of spatial locality even beyond that of sectored caches and prefetch buffers, while avoiding excess cache-to-cache transfers.

Typical caches have a line size L, and the unit of coherence and unit of transfer is L. Sectored caches with sub-lines may have sub-lines (or sub-blocks) of size S, where S<L, the unit of coherence may be S, and the unit of transfer may be S or L. In a cache in accordance with the invention, the line size is L, the unit of transfer may be L or integer multiples of L, and the unit of coherence is L and integer multiples of L. Groups of lines may complement use of sub-lines. That is, sectored caches with sub-lines, and snooping, may be used within each node, and groups of lines, with a directory or coherence filter, may be used across multiple nodes.

If a memory system retrieves N lines and places them into a register, it may be convenient to use the same N lines as a group of lines. However, it is not necessary for a group of lines to be the same size as a memory register. In some of the following discussion, a group of lines is assumed to be four lines for purposes of illustration only. Given an M-bit address, and N lines in a group of lines, a group of lines is defined by the most significant M minus $\log_2(N)$ bits of the address. For example, assuming that a group of lines is four lines, and assuming for simplicity a 16-bit address, there is a four-line group of lines defined by the 14 most significant bits of the address in conjunction with all combinations of the two least significant bits of the address.

It is known for a cache to be organized into sets, with some of the address bits used as an index to determine which set is to be used for the address. Within each set, other address bits, called a tag, are used to determine which line within a set corresponds to the address. With groups of lines in accordance with the invention, the index may correspond to a group of lines instead of a single line. For example, given an I-bit index, the most significant I-2 bits of the index may be used as an index for a four-line group of lines. One tag may apply to the entire group of lines. Alternatively, each line preferably has a separate addressable entry, as determined by the tag for the line. Each line preferably has its own coherency state, and the overall group may optionally have a separate coherency state for convenience. The separate coherency state for the overall group is discussed in more detail later.

From the above discussion, given an address, N lines may be retrieved from memory, or from another cache, as a group, and N lines may be placed into a cache as a group. Once the group of lines is placed into the cache, the lines may be treated as a group, or as separate lines, as discussed below.

Cache coherence protocols commonly place each cached line into one of multiple states. One common approach uses three possible states for each line in a cache. Before any lines are placed into the cache, all entries are at a default state called "Invalid". When a previously uncached physical line is placed into the cache, the state of the entry in the cache is changed from Invalid to "Shared". If a line is modified in a cache, it may also be immediately modified in memory (called write through). Alternatively, a cache may write a modified line to memory only when the modified line in the cache is invalidated or replaced (called write back). For a write-back cache, when a line in the cache is modified or will be modified, the state of the entry in the cache is changed to "Modified". The three-state assignment just described is sometimes called a MSI protocol, referring to the first letter of each of the three states.

A common variation adds one additional state. In the variation, when a physical line is copied into the cache, if no copy of the line exists in any other cache, the line is placed in an "Exclusive" state. The word "Exclusive" means that exactly one cache hierarchy has a copy of the line. If a line is in an "Exclusive" state in a cache hierarchy for a first processor, and if a second processor requests the same line, the line will then be copied into two cache hierarchies, and the state of the entry in each cache is set to "Shared". This four-state assignment just described is sometimes called a MESI protocol, referring to the first letter of each of the four states. There are many other variations.

A line in the Exclusive state may be modified at any time by its owner without further coherency operations. Once modified, the line is marked as Modified in the local cache. The Exclusive state allows a line to be owned (the only copy in the system), without being modified. This scheme reduces the number of extra coherence requests needed to modify a line.

In the following discussion, the MESI protocol is used to illustrate a first example embodiment of the invention. The invention is equally applicable to other cache coherency systems and methods. In addition, some further assumptions are made to facilitate discussion of a first example embodiment, as follows. A line is owned in the MESI protocol if it is in the Modified or Exclusive state. For purposes of illustration only, if a line has an owner (state Modified or Exclusive), and the line is requested by a requestor that may modify the line, the most current copy of the line will be provided to the requester, and in addition will be written to memory. The previous owner will Invalidate its copy of the line, and the new owner will set the initial state of the line to Exclusive. If a line is not owned (not cached, or cached with state Shared), the requester will set the initial state of the line to Shared.

Additional assumptions may be useful for groups of lines. If a requested line is in a group of lines that has mixed ownership (that is, at least two lines in the group have different owners), then the requester preferably should get ownership of only the one requested line to avoid excessive cache-to-ache transfers. In contrast, if a requested line is in a group of lines that is entirely owned by a single owner, then it is likely that ownership of an entire data structure is changing, and the requester preferably should get ownership of the entire group of lines. These rules reduce latency for groups of lines by transferring a group of lines and ownership of the group if the lines all used to be owned by the same previous owner, while preventing increased cache-to cache-transfers by not combining lines that have a history of being owned by different owners at the same time.

Still another optional feature of a system in accordance with the invention is to give the requester control over whether multiple lines should be transferred when only one line is requested. Specifically, new memory system commands may be implemented that optionally limit a request to a single line, or optionally permit multiple lines to be transferred.

Figure 2:
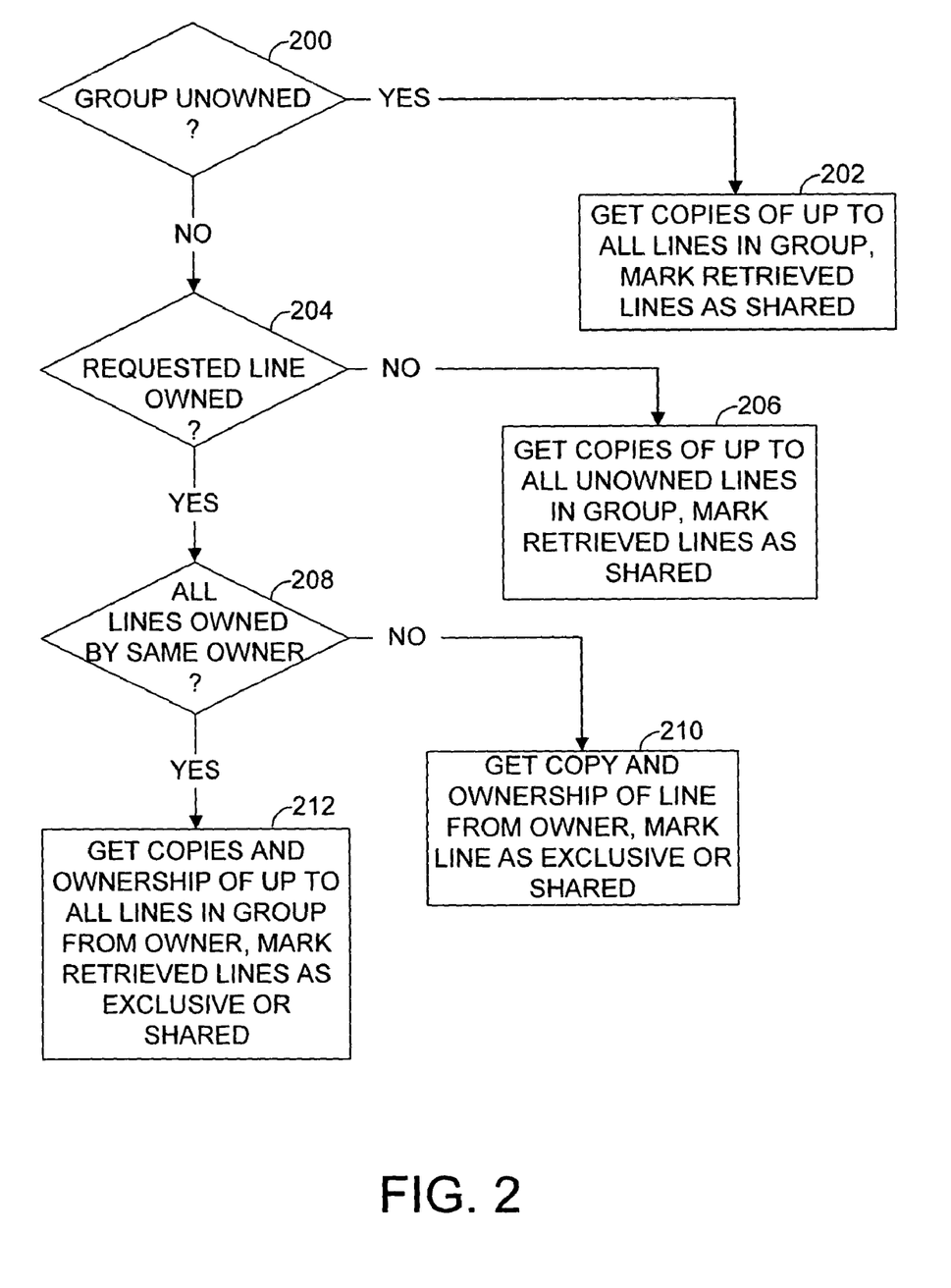
FIG. 2 is a flow chart of an example method for maintaining coherence for a line request without a request for ownership.
Figure 3:
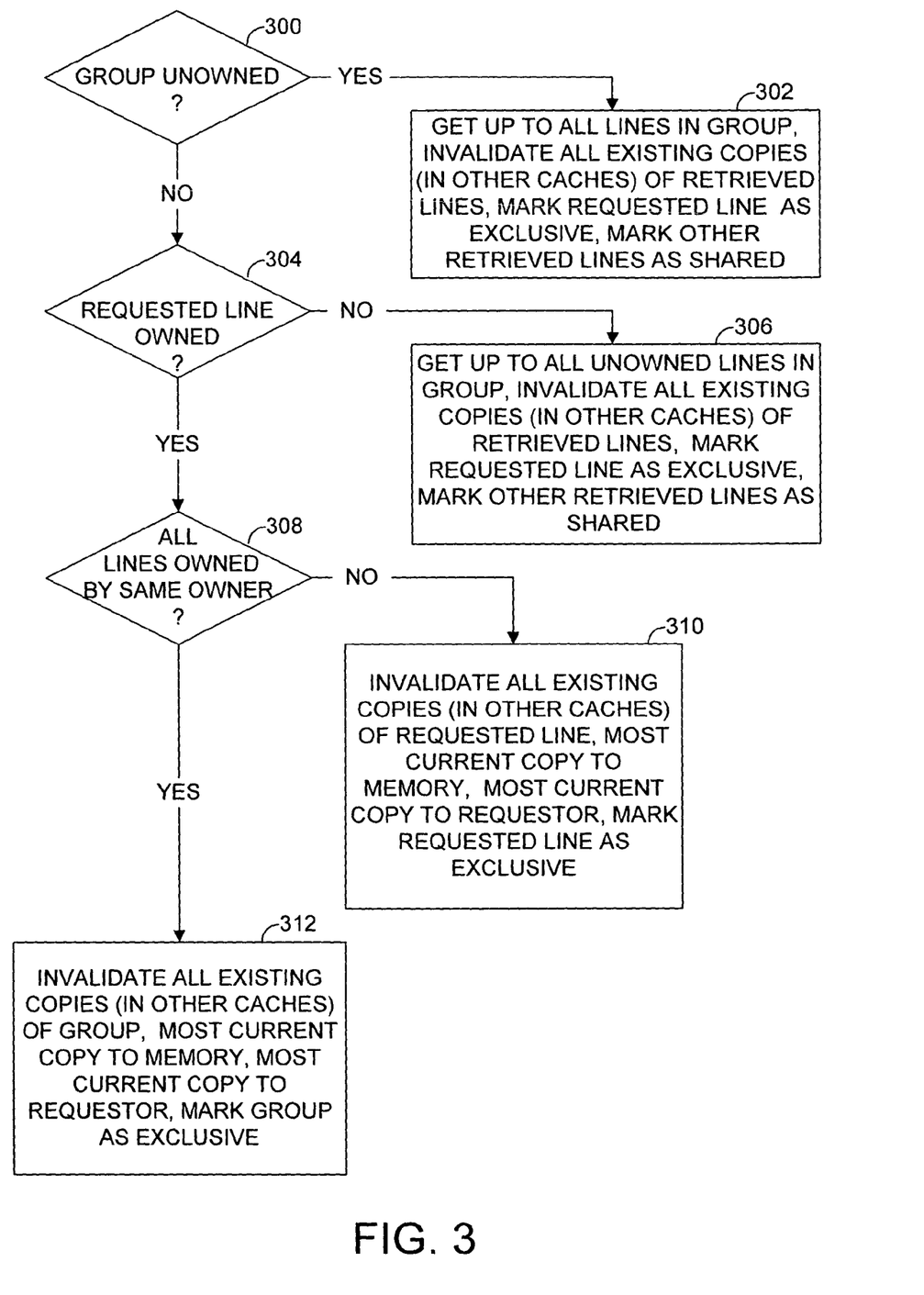
FIG. 3 is a flow chart of an example method for maintaining coherence for a line request with a request for ownership.
Figure 4:
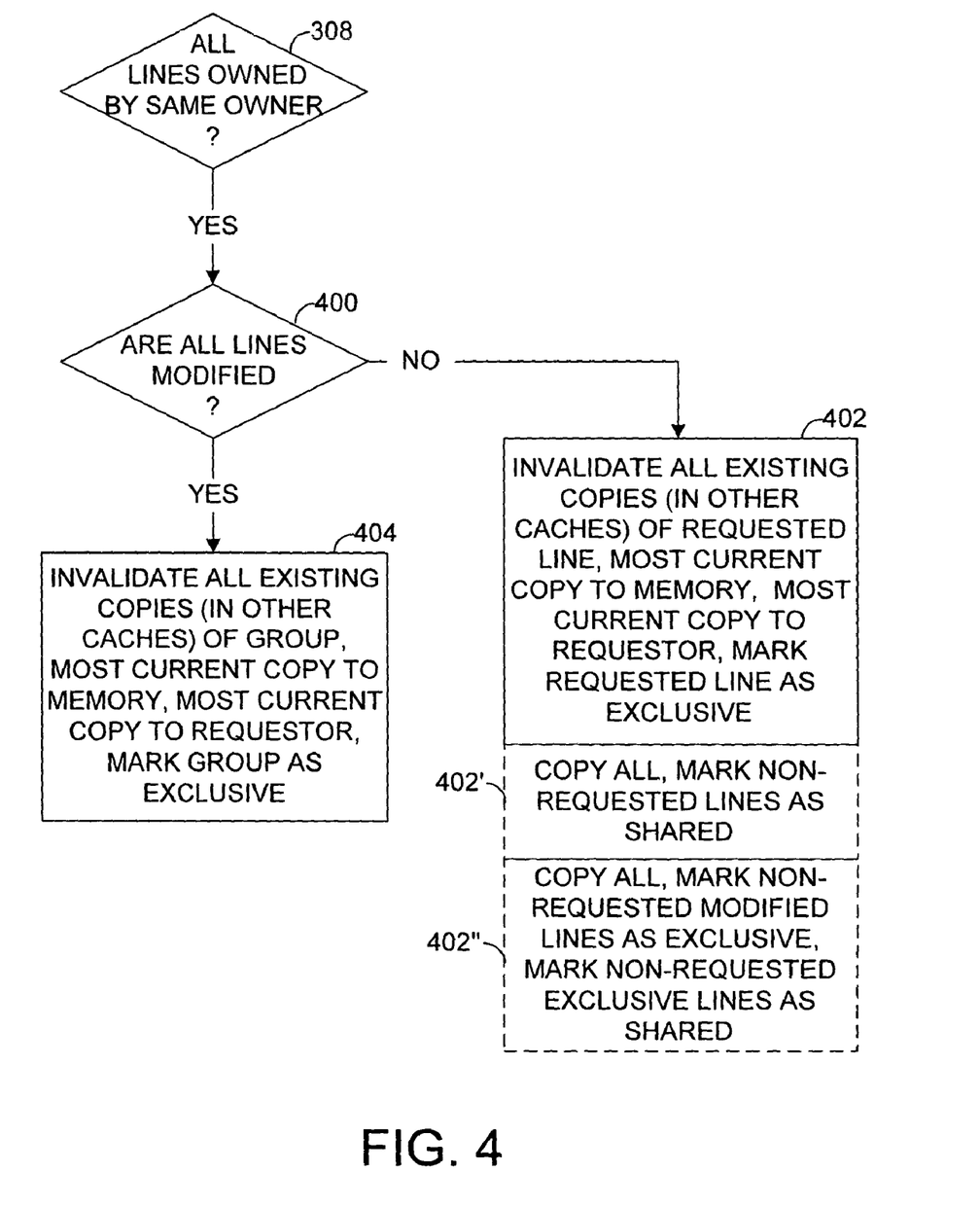
FIG. 4 is a flow chart of an example alternative method for part of FIG. 3.

Given the above assumptions and features, FIG. 2 illustrates an example method for maintaining coherency for groups of lines for a line request in which ownership of the requested line is not requested. FIGS. 3 and 4 illustrate an example method for maintaining coherency for a group of lines for a line request in which ownership of the requested line is requested. In FIG. 1, and in the following discussion of FIGS. 2-4, a directory is assumed for purposes of an example system, but coherency filters or other coherency methods are equally suitable.

In FIG. 2, a line is requested, but ownership of the line is not requested. That is, the requester needs to read the data, and does not need to modify the data. Coherency states for the corresponding group of lines are checked in the directory. At step 200, if all lines in the corresponding group of lines are unowned (for MESI, no lines are in the Modified or Exclusive state in any cache), then at step 202 the requester gets a copy of the requested line, and copies of up to all of the other lines in the corresponding group of lines. The requester will mark its copy of retrieved lines as Shared (both locally and within the appropriate directory), and the requestor will mark its entry locations for any non-retrieved lines as Invalid. At step 204, if some lines in the corresponding group of lines are owned, and the requested line is not owned, then at step 206 the requestor gets a copy of the requested line, and copies of up to all of the other unowned lines in the corresponding group of lines. The requestor will mark its copy of retrieved lines as Shared (both locally and within the appropriate directory), and the requestor will mark its entry locations for any non-retrieved lines as Invalid.

Note that at steps 202 and 206, the requested line, and perhaps other lines in a group of lines, are not owned. Therefore, the unowned lines may be retrieved from memory, and as discussed above, for a multiple-bus system the unowned lines at a remote node are preferably retrieved from memory. The system may use snooping within a node, with a resulting priority placed on retrieving lines from cache if available, and may use a directory or coherency filter across nodes, with a priority placed on retrieving lines from memory. As a result, latency per line is reduced because multiple lines are transferred with a single request, and for multiple-bus systems, latency is further reduced, and local bus traffic is reduced, because the lines are retrieved from memory instead of from caches.

At step 208, the requested line is owned, and if ownership within the group of lines is mixed (that is, some lines in the corresponding group of lines are owned by different owners), then at step 210 the requester gets just the requested line from the owner. As discussed above, the requestor preferably should get ownership of only the one requested line to avoid excessive cache-to-cache transfers. The requestor will mark its copy of the retrieved line as Exclusive or Shared (both locally and within the appropriate directory), and the requester will mark its entry locations for the non-retrieved lines as Invalid. At step 212, all lines in the corresponding group of lines are owned by the same owner. The requestor can get a copy of the requested line and copies of up to all the other lines in the group from the owner. As discussed above, it is likely that ownership of an entire data structure is changing, and the requester preferably should get a copy of the entire group of lines. The requester will mark its copy of retrieved lines as Exclusive or Shared (both locally and within the appropriate directory), and the requestor will mark its entry locations for any non-retrieved lines as Invalid.

In FIG. 3, a line is requested, and ownership of the line is requested. At step 300, if all lines in the corresponding group of lines are unowned, then at step 302 the requester can get a copy of the requested line, and up to all of the other lines in the corresponding group of lines. All existing copies of the requested lines, other than the requestor's copy, will be marked as Invalid. The requester will mark its copy of the requested line as Exclusive, and its copies of other retrieved lines as Shared (both locally and within the appropriate directory), and the requestor will mark its entry locations for any non-retrieved lines as Invalid. At step 304, if some lines in the corresponding group of lines are owned, and the requested line is not owned, then at step 306 the requestor gets a copy of the requested line, and copies of up to all of the other unowned lines in the corresponding group of lines. All existing copies of the requested lines, other than the requestor's copy, will be marked as Invalid. The requestor will mark its copy of the requested line as Exclusive (both locally and within the appropriate directory), and the requester will mark its copies of any other retrieved lines as Shared, and the requestor will mark its entry locations for any non-retrieved lines as Invalid. As discussed above in conjunction with FIG. 2, for a multiple-bus system, unowned lines are preferably retrieved from memory. Exclusive lines can be retrieved from either the owning cache or main memory.

At step 308, the requested line is owned, and if some lines in the corresponding group of lines are owned by different owners, then at step 310 the requester gets just the requested line from the owner of the requested line. All existing copies of the requested line, other than the requestor's copy, are marked as Invalid. The requester will mark its copy of the requested line as Exclusive (both locally and within the appropriate directory), and the requester will mark its entry locations for the non-retrieved lines as Invalid. At step 312, all lines in the corresponding group of lines are owned by the same owner. As discussed above, it is likely that ownership of an entire data structure is changing, and the requester preferably should get ownership of the entire group of lines. At step 312, the most current copy of the entire group is copied to memory, and copied to the requester, and all existing copies of the group, other than the requestor's copy, are marked as Invalid. The requester will mark its copy of the group as Exclusive (both locally and within the appropriate directory).

The choice of whether to copy an entire group, or only a subset of a group, to a requestor, may be changed. In particular, in FIG. 3, step 312, a group is owned, and the entire group of lines is copied to the requester. It is possible that group ownership can lead to thrashing (excessive cache-to-cache transfers). FIG. 4 illustrates an alternative method, starting at the "YES" decision for step 308 in FIG. 3, in which ownership of a group can be broken up if it is only partially modified by the current owner.

In FIG. 4, an additional test 400 is added to determine whether all lines in a group of lines have been modified by one original owner. At step 400, the entire group of lines is owned, and if some lines have not been modified (some lines are not in the Modified state), then at step 402 only the requested line is copied to the requester. The requestor will mark its copy of the requested line as Exclusive (both locally and within the appropriate directory), and the requester will mark its entry locations for the non-retrieved lines as Invalid. As an alternative, at step 402', in addition to copying the requested line, all lines other than the requested line could be copied, and the state of the lines other than the requested line could be marked as Shared. As still another alternative, at step 402", in addition to copying the requested line, all lines other than the requested line could be copied, and the state of all non-requested lines formerly in the Modified state could be marked as Exclusive, and the state of all non-requested lines formerly in the Exclusive state could be marked as Shared. Therefore, even though all lines were owned by one owner, if two caches need to modify different lines within a group, each can obtain ownership of different lines, and thrashing is avoided. If the entire group is modified by the original owner, then at step 404 ownership of the entire group is transferred to the requester, and thrashing is unlikely.

In addition, the choice of whether to allow an original copy of an unowned group to remain may be changed. For example, in FIG. 2, step 202, the existing copy of the entire group of lines could be invalidated. However, if the space is not needed, the original copy of the group of lines can be permitted to remain, as illustrated in FIG. 2. The system can track where copies of lines exist, and if a line is modified, only the caches with copies of the modified lines have to be notified.

As discussed above, directories and global coherency filters reduce coherency traffic on a bus, while increasing latency. Reading and writing groups of lines reduces coherency traffic, so that a bus based system as in FIG. 1 may be used where directories or global coherency filters would otherwise be required. In addition, the present invention is equally applicable to systems using directories or global coherency filters. For example, for each of the steps where coherency states are determined (FIG. 2, 200, 204, 208; FIG. 3, 300, 304, 308; FIG. 4, 400), the coherency states can be determined by snooping, or by checking a directory, or by checking a global coherency filter.

From FIGS. 2-5, ownership is an important concept for the invention. Coherency states based on ownership rather than MESI would be particularly useful. In a previous application (U.S. patent application Ser. No. 09/704,176, filed Oct. 31, 2000, now U.S. Pat. No. 6,868,481), an alternative to snooping, directories, and global coherency filters, is disclosed. In U.S. Pat. No. 6,868,481, a computer system maintains a list of tags (called a Global Ownership Tag List, or GOTL) for all the cache lines in the system for which a cache has ownership. That is, for each tag in the GOTL, the corresponding line may be dirty, or may be only potentially dirty (modifiable). A GOTL is inclusive of owned lines, and is generally not inclusive of all Shared lines in the system. If a line does not have an entry in the GOTL, the line may be assumed to be Shared. Note also that with a GOTL, ownership can be transferred without having to actually transfer the data.

A GOTL is particularly applicable to the present invention. That is, a GOTL may have an entry for each group of lines, for which at least one line is owned. In addition, each entry may include information regarding the coherency state of each line within the group of lines, and which processor, or cache, or node, or bus, is the owner of the line. If a particular line in a cache is owned, then the tags for the corresponding group of lines may be placed into the GOTL, and as part of the GOTL entry, the particular line is marked as owned, and the owner is identified. For each of the steps where coherency states are determined (FIG. 2, 200, 204, 208; FIG. 3, 300, 304, 308; FIG. 4, 400), the coherency states can be determined by checking the GOTL. Note, however, that normally an address for a line is in the GOTL only if the line is owned, whereas an address for a group of lines in the GOTL may remain in the GOTL even if each individual line in the group is marked shared. For example, as discussed above, in FIG. 2, step 202, the existing copy of the entire group of lines could be invalidated, or if the space is not needed, the original copy of the group of lines can be permitted to remain. If space in the GOTL is needed, the system may choose to evict unowned groups of lines before evicting groups with at least partial ownership.

Figure 5:
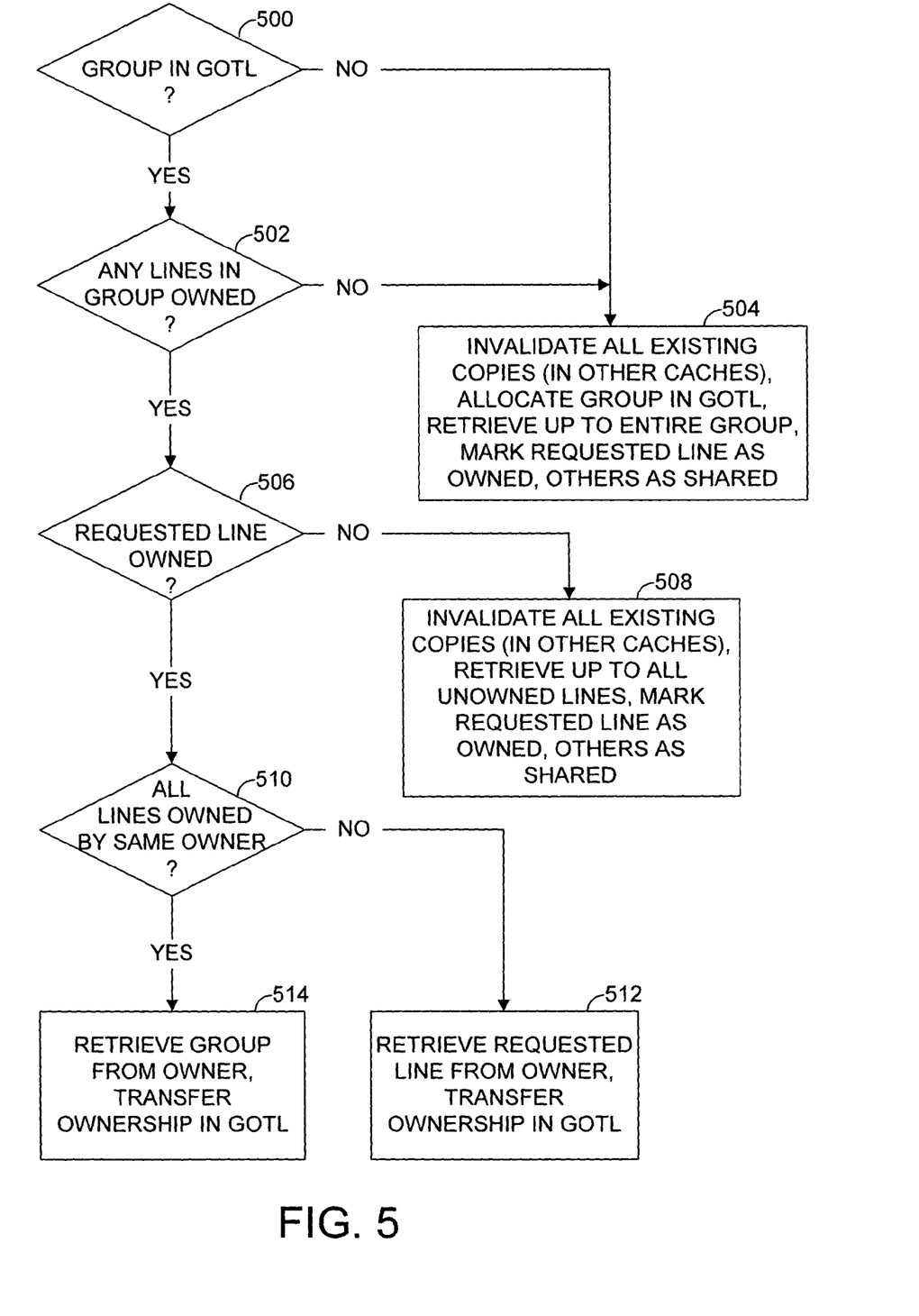
FIG. 5 is a flow chart of an example alternative to the methods of FIGS. 2-4.

FIG. 5 illustrates an example of a counterpart to FIGS. 3 and 4 (ownership requested) when using a GOTL. Recall from the above discussion that optionally a group of lines may be permitted to remain in a cache even though it is no longer partially owned. Accordingly, an entry for a group of lines may remain in a GOTL, even though no lines within the group of lines is owned. That is, an entry is made in a GOTL whenever a line within the group of lines is owned, but the entry is not necessarily immediately removed if all lines within the group of lines become unowned. The GOTL is only inclusive of the dirty lines. If the group of lines, which includes the requested line, is not in the GOTL (step 500), or if the group of lines remains in the GOTL but is entirely unowned (step 502), then the requestor receives up to the entire group-of-lines (step 504). If the requested line is not owned, but other lines in the group of lines are owned (step 506), then up to all unowned lines are received (step 508). If the requested line is owned, and the group of lines has mixed ownership, then only the requested line is received (step 512). If the entire group of lines is owned by the same owner, then the entire group of lines is received (step 514).

Note that in FIGS. 2-4, some steps result in a subset of a group being copied, for example, FIG. 2, 202. For example, when a CPU instruction requests a single line, all unowned lines in the corresponding group of lines may be speculatively copied in case they may be needed soon. Alternatively, ownership of multiple lines may be granted even though the requestor only requests one line. Alternatively, a special CPU instruction may be implemented that expressly requests a line plus all unowned other lines in a group of lines. In any of the alternatives, the system will copy a minimum of the requested line. Alternatively, a special CPU instruction may be implemented that expressly requests a copy or ownership of an entire group of lines. Depending on the rest of the system architecture, requests that ask for more than one line may have to be carried out in a single indivisible operation.

In the above description, coherency is maintained for groups of lines. One could, for example, use MESI, where a group of lines is in the M state only if all lines in the group are in the M state, and so forth. However, for the methods illustrated in FIGS. 2-5, ownership provides more useful coherency information for groups of lines. In particular, for the methods illustrated in FIGS. 2-5, the following set of ownership coherency states for groups of lines would be preferable for decisions 200, 208, 300, 308, 400, 502, and 510:

Unowned (all lines within the group are unowned)

Not One Owner (at least one line is owned, and all lines are not owned by one owner)

One Owner (all lines within the group are owned by the same owner)

One Owner Modified (all lines within the group are modified by the same owner)

In addition, for purposes of the decisions in FIGS. 2-5, ownership only needs to be at a node level rather than at a cache level. For example, it is sufficient to know that all lines within a group are owned by caches that are all within one node and can be snooped on one bus.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A computer system, comprising:
a cache memory that reads and caches a group of lines with a single memory transaction; and
a system for maintaining identity of which device, if any, owns the group of lines,
and which device, if any, owns each individual line within the group of lines.

2. The computer system of claim 1, further comprising:
at least two lines in the group of lines having separate owners.

3. A computer system, comprising:
a cache memory that reads a group of lines with a single memory transaction; and
the cache memory receiving fewer than all lines within the group of lines, when the group of lines is requested, and when the group of lines is partially owned by another cache memory.

4. A method of maintaining coherency for a computer system, comprising:
retrieving a group of lines in response to a request for a single line; and
maintaining ownership information for the group of lines and for each individual line within the group of lines.

5. A method of transferring lines of memory in a computer system, comprising:
requesting, by a processor, a line of memory;
copying, from a shared memory, to a cache memory, the line of memory requested;
copying, from the shared memory to the cache memory, all additional unowned lines within a group of lines corresponding to the requested line, and not copying any owned lines, other than the requested line, within the group of lines.

6. The method of claim 5, further comprising:
setting a coherency state, within the cache memory, of an entry location for a line in the group of lines that is not copied, to a state that indicates that the contents of the entry location are invalid.

7. A method for maintaining coherency for a computer system, comprising:
(a) requesting, by a processor, a line of memory, the line of memory within a group of lines;
(b) detecting that all lines in the group of lines have been modified by one owner;
(c) copying, in response to the request of step (a), all the lines in the group of lines to a cache memory for the processor; and
(d) setting a coherency state, within the cache memory, of all lines in the group of lines, to a state that indicates that the lines are owned by the cache memory.

* * * * *

UNITED STATES PATENT AND TRADEMARK OFFICE
CERTIFICATE OF CORRECTION

| | | |
|---|---|---|
| PATENT NO. | : 7,310,708 B2 | Page 1 of 1 |
| APPLICATION NO. | : 10/649917 | |
| DATED | : December 18, 2007 | |
| INVENTOR(S) | : Blaine D. Gaither | |

It is certified that error appears in the above-identified patent and that said Letters Patent is hereby corrected as shown below:

Column 6, line 39, delete "cache-to-ache" and insert -- cache-to-cache --, therefor.

Signed and Sealed this

Eighth Day of April, 2008

JON W. DUDAS
*Director of the United States Patent and Trademark Office*